United States Patent [19]
Ito

[11] Patent Number: 5,268,838
[45] Date of Patent: Dec. 7, 1993

[54] PRODUCTION CONTROL SYSTEM FOR CONTROLLING PRODUCING POINTS

[75] Inventor: Joji Ito, Hadano, Japan

[73] Assignee: Fujitsu Limited, Kawasaki, Japan

[21] Appl. No.: 728,889

[22] Filed: Jul. 10, 1991

[30] Foreign Application Priority Data

Jul. 10, 1990 [JP] Japan .................. 2-182462

[51] Int. Cl.⁵ .............................................. G06F 15/22
[52] U.S. Cl. ................................... 364/401; 364/406; 364/408; 364/468
[58] Field of Search ............... 364/401, 468, 406, 408

[56] References Cited

U.S. PATENT DOCUMENTS

| | | | |
|---|---|---|---|
| 4,827,423 | 5/1989 | Beasley et al. | 364/468 |
| 4,958,292 | 9/1990 | Kaneko et al. | 364/468 |
| 4,998,206 | 3/1991 | Jones et al. | 364/468 |
| 5,093,794 | 3/1992 | Howie et al. | 364/468 |

FOREIGN PATENT DOCUMENTS

| | | |
|---|---|---|
| 251051 | of 1987 | Japan . |
| 2-34142 | of 1989 | Japan . |
| 35671 | of 1989 | Japan . |
| 131829 | of 1990 | Japan . |

Primary Examiner—Roy N. Envall, Jr.
Assistant Examiner—Frantzy Poinvil

[57] ABSTRACT

A production control system controls a plurality of producing points so that products are produced while supplying parts among the producing points. The production control system includes a first producing point which is used as a center producing point and includes a data base, second producing points respectively having a data base, and one or a plurality of communication networks coupling the data bases of the first producing point and the second producing points. The first producing point has a first device for managing at least process sequence information which describes production processes and production times of each products for each of the first and second producing points, capability information which describes the capability of each process for each of the first and second producing points, and surplus item information which describes surplus parts and/or products for each of the first and second producing points, a second device for determining an optimum producing point for producing each product out of the first and second producing points based on new order information for each product received at each of the first and second producing points, and a third device for instructing production of each product to the optimum producing point based on the new order information.

8 Claims, 8 Drawing Sheets

| ITEM NAME | REQUIRED NO. | PRODUCTION TIME |
|---|---|---|

FIG.6B

| ITEM NAME | REQUIRED NO. | DESIRED DELIVERY DATE |
|---|---|---|

FIG.6C

| POINT NO. | ITEM NAME | PROCESS SEQ. | PROCESS NO. | STD. TIME |
|---|---|---|---|---|

FIG.6D

| POINT NO. | ITEM NAME | SURPLUS TIME | SURPLUS NO. |
|---|---|---|---|

FIG.6E

| POINT NO. | PROCESS NO. | SURPLUS TIME | SURPLUS CAPABILITY LIMIT |
|---|---|---|---|

FIG.8A

| ITEM NAME | REQUIRED NO. | PRODUCTION TIME |
|---|---|---|

FIG.8B

| ITEM NAME | NO. OF ITEMS AVAILABLE BY WEEK | - - - - | NO. OF ITEMS AVAILABLE BY WEEK |
|---|---|---|---|

52 WEEKS

FIG.8C

| ITEM NAME | SUPPLYING POINT | SUPPLYING SEQ. |
|---|---|---|

FIG.8D

| POINT NO. | DIFF. IN TIME & DAY | Y. M. D. | HOLIDAY FLAG | - - - - | Y. M. D. | HORIDAY FLAG |
|---|---|---|---|---|---|---|

# PRODUCTION CONTROL SYSTEM FOR CONTROLLING PRODUCING POINTS

BACKGROUND OF THE INVENTION

The present invention generally relates to production control systems, and more particularly to a production control system which controls a plurality of producing points which supply parts among one another and respectively produce products in accordance with orders received.

Recently, there is a demand on the producers to quickly adjust to the demands in order to cope with the requests of customers to deliver the products on short notice and to cope with the dispersion of the producing points on a global basis for the purpose of meeting the spreading market.

Conventionally, each producing point made the production plan according to the orders received from the customers and intended for each individual producing point. In other words, the producing point individually determined its policy according to the orders received based on reports made at periodic planning stages.

However, the management system was closed for each producing point even when the producing points are commonly owned by one company, for example. For this reason, the demands may change between the planning stage and the actual production stage, and there is a problem in that the factory operations may become unbalanced due to the surplus of unwanted parts and products at each producing point.

SUMMARY OF THE INVENTION

Accordingly, it is a general object of the present invention to provide a novel and useful production control system in which the problem described above is eliminated.

Another and more specific object of the present invention is to provide a production control system for controlling a plurality of producing points so that products are produced while parts are supplied to the producing points, comprising a first producing point which is used as a center producing point and includes a data base, second producing points respectively having a data base, and at least one communication network coupling the data bases of the first producing point and the second producing points, wherein the first producing point comprises first means for managing at least process sequence information which describes production processes and production times of each product for each of the first and second producing points, capability information which describes the capability of each process for each of the first and second producing points, and surplus item information which describes surplus parts and/or products for each of the first and second producing points, second means for determining an optimum producing point for producing each product out of the first and second producing points based on new order information for each product received at each of the first and second producing points, and third means for instructing production of each product to the optimum producing point based on the new order information. According to the production control system of the present invention, the operation at each of the second producing points can be grasped centrally at the first producing point, and it is possible to effectively utilize the surplus parts at each of the producing points. Hence, it is possible to easily cope with the change in demands at each of the producing points even when the producing points are globally dispersed.

Other objects and further features of the present invention will be apparent from the following detailed description when read in conjunction with the accompanying drawings.

DESCRIPTION OF THE PREFERRED EMBODIMENTS

Figure 1:
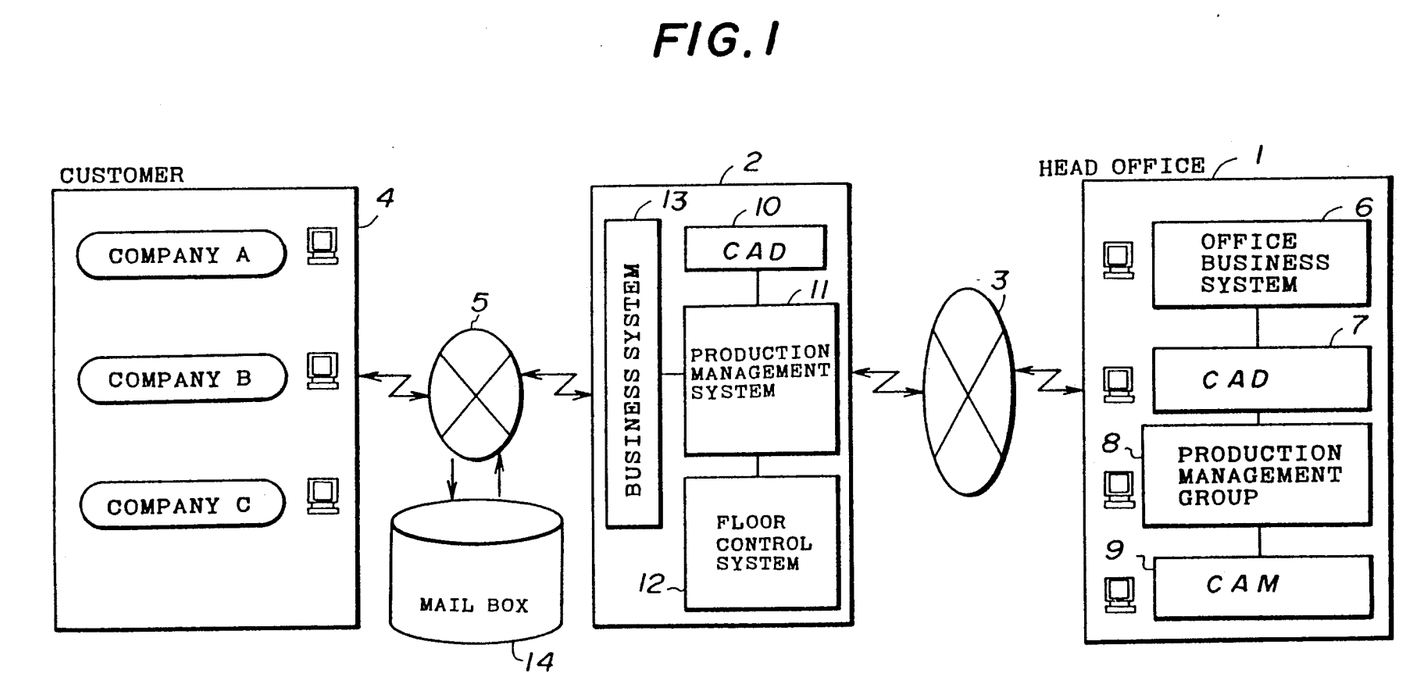
FIG. 1 is a block diagram for explaining an operating principle of a production control system according to the present invention.

First, a description will be given of an operating principle of a production control system according to the present invention, by referring to FIG. 1. In FIG. 1, a center producing point 1 is coupled to a producing point 2 via a data transmission network 3. For example, the center producing point 1 is the headquarters of business located in a home country, while the producing point 2 is the producing center located in a foreign country. Customers 4 who place orders to the producing point 2 are coupled to the producing point 2 via a data switching network 5 which may be an electronic data interchange (EDI). The data switching network 5 is coupled to a mail box 14 which is classified by customer.

The center producing point 1 includes a head office business system 6 which exists in the head office, a computer aided design (CAD) group 7, a production management group 8, and a computer aided manufacturing (CAM) group 9. For example, the head office business system 6 is in charge of export business.

The producing point 2 includes a CAD group 10 which exists in the producing center, a production management system 11, a floor control system 12, and a business system 13. The floor control system 12 controls the facilities of the production floor within the producing point 2. The business system 13 is a system group which makes correspondence with the customers 4.

In the producing point 2, the business system 13 processes the orders received from the customers 4. The CAD group 10 makes designs in accordance with the orders, and the production management system 11 manages the production. In addition, the floor control system 12 is started, and the products corresponding to the orders are delivered to the customers 4.

The center producing point 1 manages the groups according to unified standards, including each producing point 2. Hence, the design information and production information of all of the producing points 2 are centrally managed by the center producing point 1.

New order information and information related to operating states at each of the producing points 2 are managed centrally by the center producing point 1, and the production management group 8 of the center producing point 1 determines which products are to be produced at which producing point 2 and how the parts are to be supplied.

Each producing point 2 notifies the new order information which is received from the customers 4 and the information related to the operating state thereof to the center producing point 1 via the data transmission network 3. The center producing point 1 manages for each of the producing points 2 at least (i) information related to the production sequence of each product, (ii) information which describes the capability of the producing point 2 for each process, and (iii) information related to surplus parts. Hence, when the center producing point 1 copes with the new order information which is notified from one of the producing points 2, the center producing point 1 determines which producing points 2 have the reserve capability to produce the required parts and/or products according to the new order information.

Furthermore, the center producing point 1 manages for each of the producing points 2 at least (iv) stock planning information which describes the number of parts available with lapse of time, (v) stock master information which describes information related to the supply of parts, and (vi) calendar information which includes information related to holidays of the region or country where the producing point 2 is located. Thus, the center producing point 1 determines which producing points 2 are to supply the parts when producing the products at one producing point 2.

Figure 2:
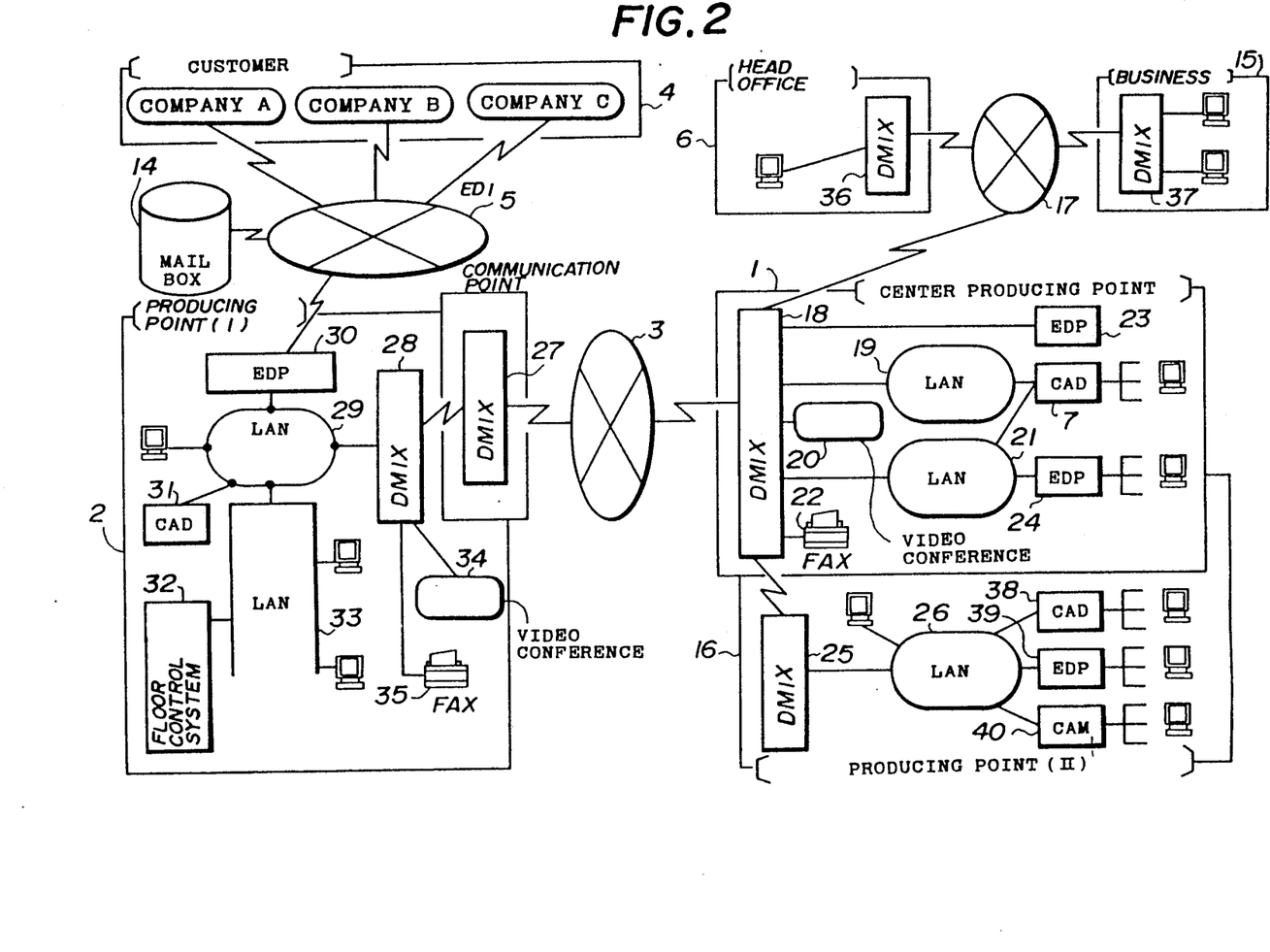
FIG. 2 is a block diagram showing an embodiment of the production control system according to the present invention.

Next, a description will be given of an embodiment of the production control system according to the present invention, by referring to FIG. 2. In FIG. 2, those parts which are the same as those corresponding parts in FIG. 1 are designated by the same reference numerals, and a description thereof will be omitted.

A business office 15 is coupled to the head office business system 6 via an internal network 17. The center producing point 1 is coupled to the producing point 2 (hereinafter also referred to as a producing point (I)) located in a foreign country and to a producing point 16 (hereinafter also referred to as a producing point (II)) located within the home country. The business office 15 includes a transmission/reception equipment 37, and the head office business system 6 includes a transmission/reception equipment 36.

The center producing point 1 includes a transmission/reception equipment 18, optical local area networks (LANs) 19 and 21 which employ optical communication, a video conference equipment 20, a facsimile machine 22, a data processor 23 and 24, and a CAD group 7. The producing point 16 (I) includes a transmission/reception equipment 25, an optical LAN 26, a CAD group 38, a data processor 39 and a CAM group 40. The producing point 2 (I) includes a communication point which includes a transmission/reception equipment 27, a transmission/reception equipment 28, a multi-purpose LAN 29, a data processor 30, a processor 31 for CAD and production management, a floor control system 32, a LAN 33, a video conference system 34 and a facsimile machine 35.

The producing point 2 (I) is coupled to the center producing point 1 via the data transmission network 3. The producing point 16 (II), the head office business system 6 and the business office 15 are coupled to the center producing point 1 via a data transmission line or the internal network 17. The groups within the center producing point 1 are coupled via the optical LANs 19 and 21.

The producing point 2 (I) is coupled to the data transmission network 3 via the transmission/reception equipments 27 and 28. The data processor 30 of the producing point 2 (I) is coupled to the data switching network 5 to which the customers 4 and the mail box 14 are coupled. A high-speed communication is possible among groups within the producing point 2 (I) by use of the multi-purpose LAN 29. The data processor 30 and the processor 31 are coupled to the transmission/reception equipment 29 via the multi-purpose LAN 29, while the floor control system 32 is coupled to the transmission/reception equipment 28 via the LAN 33 and the multi-purpose LAN 29. The video conference system 34 and the facsimile machine 35 are coupled to the transmission/reception equipment 28.

The producing point 16 (II) is coupled to the center producing point 1 via the transmission/reception equipment 25. The CAD group 38, the data processor 39 and the CAM group 40 are coupled to the transmission/reception equipment 25 via the optical LAN 26.

For example, the data transmission network 3 is formed from two data transmission networks respectively having transmission rates of 768 kbps and 512 kbps. A video conference is made between the producing point 2(I) and the center producing point 1 using the video conference systems 34 and 20 if necessary.

The correspondence of the blocks shown in FIGS. 1 and 2 are as follows. The production management group 8 shown in FIG. 1 corresponds to the data processors 23 and 24 shown in FIG. 2. The CAM group 9 shown in FIG. 1 corresponds to the floor control system 32 or the CAM group 40 shown in FIG. 2. The CAD group 10 show in FIG. 1 corresponds to the processor 31 or the CAD group 38 shown in FIG. 2. The production management system 11 shown in FIG. 1 corresponds to t he data processors 23 and 24 shown in FIG. 2. The floor control system 12 shown in FIG. 1 corresponds to floor control system 32 shown in FIG. 2. The business system 13 shown in FIG. 1 corresponds to the data processor 30 shown in FIG. 2.

As may be seen by comparing FIGS. 1 and 2, not all of the parts within the center producing point 1 shown in FIG. 1 are provided within the center producing point 1 shown in FIG. 2. This is because FIG. 1 merely shows one block system for explaining the operating principle of the present invention. In other words, the various functions of the producing points can be distributed among the producing points where possible as long as the same functions can be realized.

Figure 3:
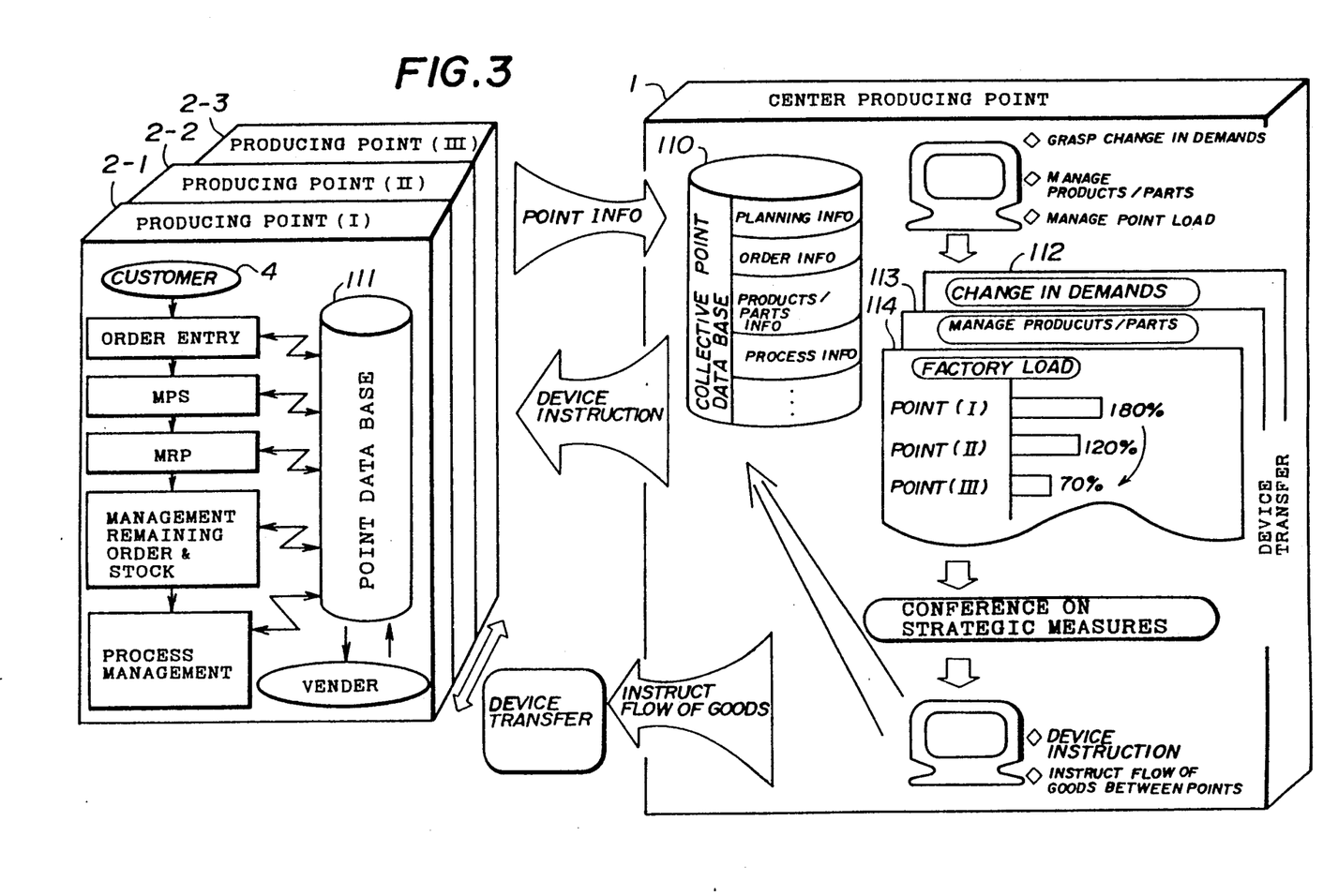
FIG. 3 is a diagram for explaining cooperation of producing points in the embodiment.

Next, a description will be given of the cooperation of the producing points in this embodiment, by referring to FIG. 3. In FIG. 3, those parts which are the same as those corresponding parts in FIG. 1 are designated by the same reference numerals, and a description thereof will be omitted. In FIG. 3, the center producing point 1 includes a collective point data base 110, a demand change information storage 112 for storing change in demands, a product/part management information storage 113 for storing management information related to products and/or parts, and a load information storage 114 for storing load information by factory. On the other hand, each of the producing points 2-1 (I), 2-2 (II) and 2-3 (III) include a point data base 111. The collective point data base 110 corresponds to the production management group 8 shown in FIG. 1, and the point data base 111 corresponds to the production management system 11 shown in in FIG. 1.

At each producing point 2-i, a schedule is made according to a master production schedule (MPS) based on the new orders (new entries) from the customers 4. Plans related to the supply of parts are made according to a material requirement planning (MRP). Remaining orders and the state of stock management are investigated, and process management for the production is carried out.

During this time, the new order information and the information and information describing the operation state obtained at each producing point 2-i are transferred to the collective point data base 110 of the center producing point 1.

The center producing point 1 keeps track on the change in the demands at each of the producing points 2-i, and manages the products/parts and the load at each producing point 2-i. In the case shown in FIG. 3, judging from the factory loads, the center producing point 1 transfers a part of the 180% load at the producing point 2-1 (I) to the producing point 2-3 (III). In addition, the center producing point 1 investigates whether or not the producing point 2-3 (III) is capable of supplying the parts required for the production, and instructs other producing points to supply the parts if necessary.

Figure 4:
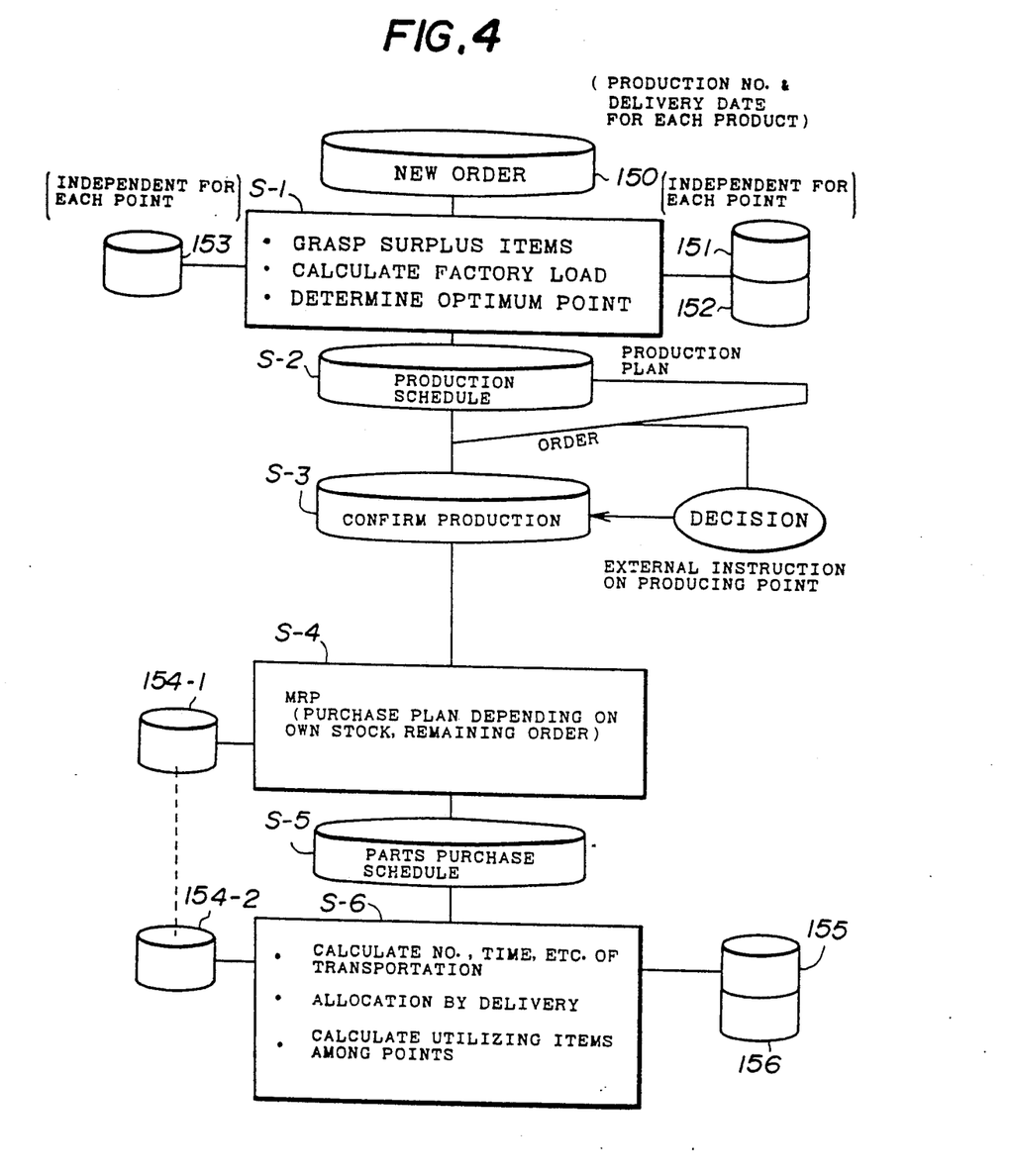
FIG. 4 is a flow chart for explaining an operation of the embodiment.

FIG. 4 is a flow chart for explaining an operation of this embodiment. In FIG. 4, process sequence information 151 describes the production processes and the production times of the products for each of the producing points. Capability information 152 describes the capability of each process for each of the producing points, such as the number of parts that can be produced. Surplus item information 153 describes the surplus parts and/or products for each of the producing points.

In addition, stock planning information 154-1 describes the number of parts available by week for each part, and is in correspondence with the producing point which is instructed to make the production. Stock planning information 154-2 describes the number of parts available by week for each part, and is in correspondence with the producing point which is instructed to supply the parts. Stock master information 155 describes the producing point which is to supply each part together with the number of parts and the time period in which the parts are to be supplied. Calendar information 156 describes the working days of each of the producing points.

In FIG. 4, a step S1 grasps the surplus parts in response to a new order 150, and determines an optimum producing point by calculating the factory loads. A step S2 makes the production schedule and generates the production plan. A step S3 makes a decision on the production. A step S4 investigates whether or not the parts can be supplied at the determined producing point. A step S5 makes a purchasing schedule with respect to each lacking part. A step S6 investigates the state of each of the other producing points, calculates the utilizing items from the other producing points, and makes transportation arrangements.

Figure 5:
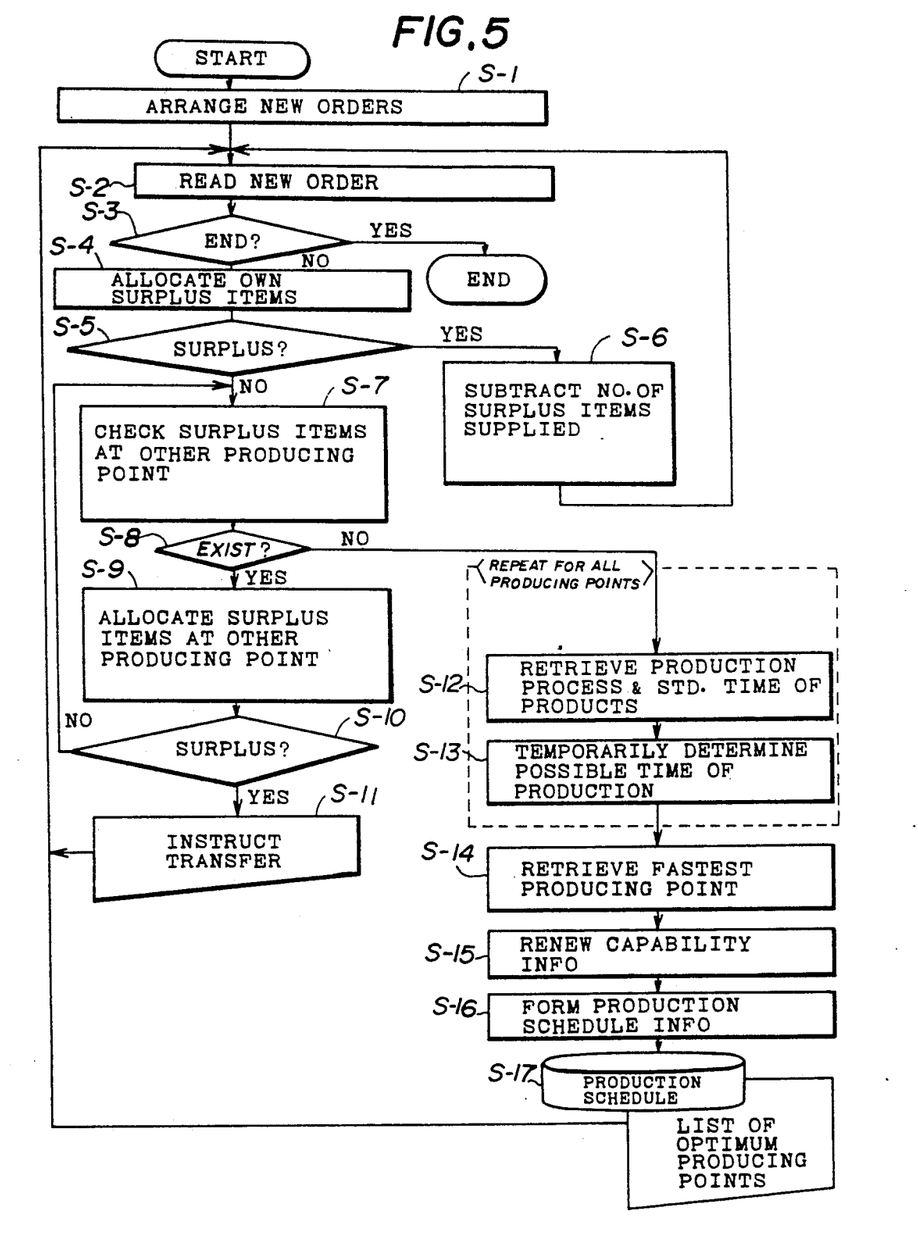
FIG. 5 is a flow chart for explaining an operation of determining a producing point in the embodiment.

FIG. 5 is a flow chart for explaining an operation of determining a producing point which is to make the production in this embodiment. A step S-1 arranges the new orders by product and according to the desired delivery dates. A step S-2 reads one of the new orders. A step S-3 checks whether or not all of the new orders are read. The process ends when the judgement result in the step S-3 is YES.

On the other hand, when the judgement result in the step S-3 is NO, steps S-4 and S-5 investigate whether or not the parts can be supplied by the surplus items of the producing point which is to make the production. In other words, the step S-4 makes allocation of the surplus items of the producing point, and the step S-5 judges whether or not this producing point has surplus items. When the judgement result in the step S-5 is YES, a step S-6 subtracts the number of surplus items supplied from the total number of surplus items of this producing point, and the process returns to the step S-2.

But when the judgement result in the step S-5 is NO, steps S-7 and S-8 investigate whether or not the surplus items of another producing point can satisfy the supply. In other words, the step S-7 checks the surplus items of this other producing point, and the step S-8 judges whether or not the surplus items of this other producing point can satisfy the supply. When the judgement result in the step S-8 is YES, a step S-9 makes allocation of the surplus items of this other producing point. A step S-10 judges whether or not the required supply can be satisfied solely by the surplus items of this other producing point. The process returns to the step S-7 when the judgement result in the step S-10 is NO. On the other hand, when the judgement result in the step S-10 is YES, a step S-11 transfers the surplus items of this other producing point to the producing point which is to make the production.

If the judgement result in the step S-8 is NO, steps S-12 and S-13 are carried out for all of the producing points. In other words, the step S-12 investigates the production processes of the products and the standard times based on the process sequence information. The step S-13 temporarily determines the possible time of production based on the capability information.

Figure 6A:
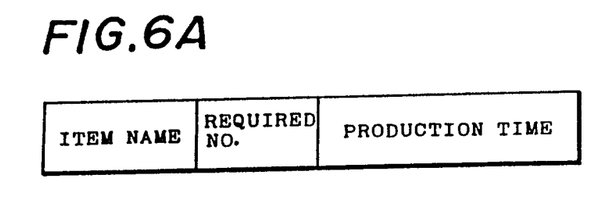
FIGS. 6A through 6E show formats of information required to carry out the operation shown in FIG. 5.
Figure 6B:
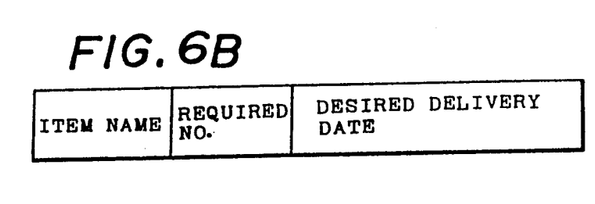
Figure 6C:
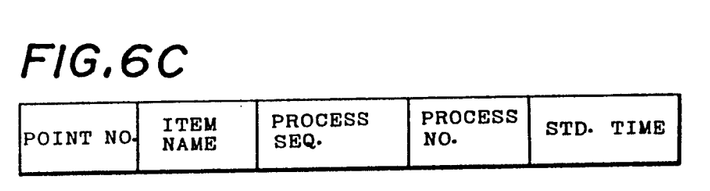
Figure 6D:
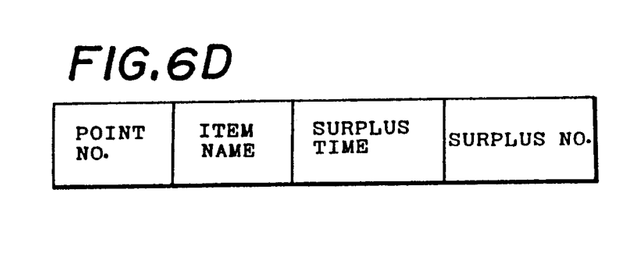
Figure 6E:
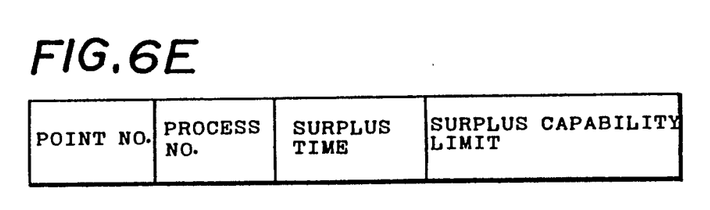

A step S-14 retrieves the producing point which can produce the product at an earliest production time out of all of the producing points. A step S-15 instructs the retrieved producing point to produce the product and renews the capability information related to this producing point. A step S-16 forms production schedule information. A step S-17 outputs the production schedule and lists up the optimum producing points. As shown in FIG. 6A, the production schedule information specifies the item name, the required number, and the production time.

FIGS. 6B through 6E show formats of other information required to carry out the operation shown in FIG. 5. The new order information shown in FIG. 6B specifies the item name, the required number, and the desired delivery date. The process sequence information shown in FIG. 6C specifies the producing point by specifying the identification number of the producing point, for example, the item name, the process sequence, the process number assigned to each process, and the standard operation time which is required. The surplus item information shown in FIG. 6D specifies the producing point by specifying the identification number of the producing point, for example, the item name, the surplus time which indicates the time for which the item is regarded as a surplus item, and the surplus number. The capability information shown in FIG. 6E specifies the producing point by specifying the identification number of the producing point, for example, the process number, the capability surplus time which indicates the time for which the surplus capability is available, and the surplus capability limit which indicates the degree of the surplus capability.

Figure 7:
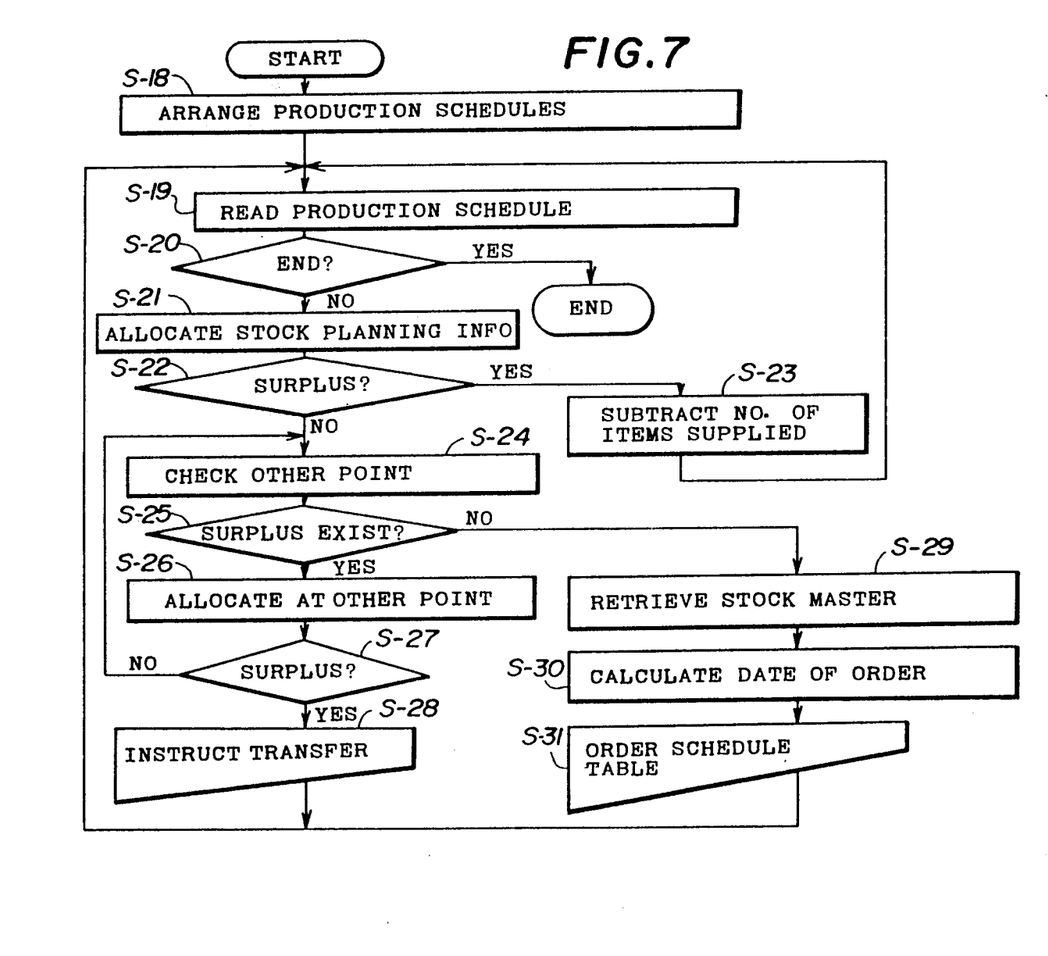
FIG. 7 is a flow chart for explaining an operation of determining supply of parts in the embodiment.
Figure 8A:
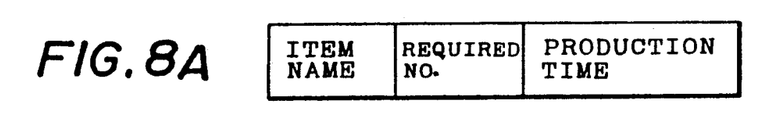
FIGS. 8A through 8D show formats of information required to carry out the operation shown in FIG. 7.
Figure 8B:
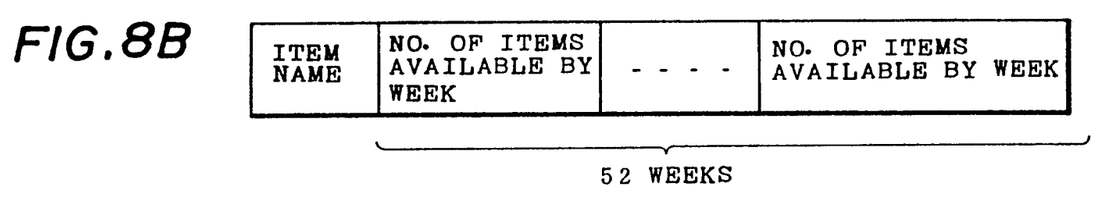
Figure 8C:
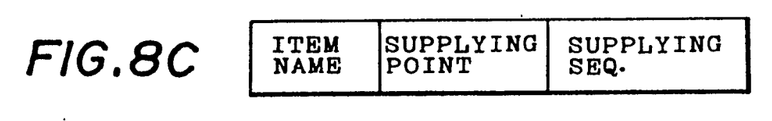
Figure 8D:
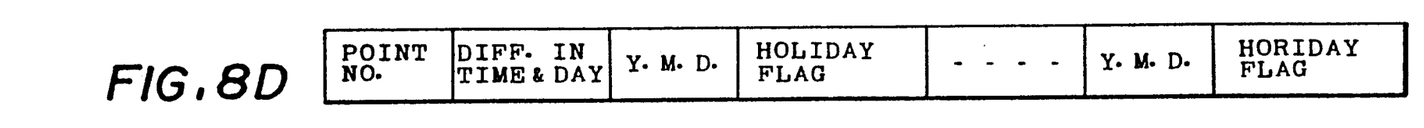

Next, a description will be given of an operation of determining supply of parts in this embodiment, by referring to FIG. 7. In FIG. 7, a step S-18 arranges the production schedules by product and by desired delivery date. A step S-19 reads one production schedule. A step S-20 judges whether or not all of the production schedules are read, and the process ends when the judgement result in the step S-20 is YES.

On the other hand, when the judgement result in the step S-20 is NO, steps S-21 and S-22 investigate the stock planning information of the producing point concerned and investigate whether or not the stock allocation is possible. In other words, the step S-21 allocates the stock planning information and the step S-22 judges whether or not surplus items exist after the allocation. When the judgement result in the step S-22 is YES, a step S-23 subtracts the number of surplus items supplied from the total number of surplus items of this producing point, and the process returns to the step S-19.

But when the judgement result in the step S-22 is NO, steps S-24 and S-25 investigate whether or not the surplus items of another producing point can satisfy the supply. In other words, the step S-24 checks the surplus items of this other producing point, and the step S-25 judges whether or not the surplus items of this other producing point can satisfy the supply. When the judgement result in the step S-25 is YES, a step S-26 makes allocation of the surplus items of this other producing point. A step S-27 judges whether or not surplus items exist after the allocation. The process returns to the step S-24 when the judgement result in the step S27 is NO. On the other hand, a step S-28 instructs the transfer of the items from this other producing point to the producing point which is to produce the product.

If the judgement result in the step S-25 is NO, a step S-29 retrieves the stock master and selects the producing point which is to supply the parts. A step S-30 investigates the calendar information related to the selected producing point, and calculates the date on which the order should be made. A step S-31 forms an order schedule table and the process returns to the step S-19.

FIGS. 8A through 8D show formats of information required to carry out the operation shown in FIG. 7. The production schedule information shown in FIG. 8A specifies the item name, the required number, and the producing time. The stock planning information shown in FIG. 8B specifies the item name, and the number of items available by week. The stock master shown in FIG. 8C specifies the item name, the producing point which supplies the items, and the supplying sequence which indicates the number of parts and the time period in which the parts are to be supplied. The calendar information shown in FIG. 8D specifies the difference in time and date, the year, month and date, and the holiday flag. For example, the year, month and date of each holiday is written into the calendar information and the holiday flag is set with respect to each holiday.

Further, the present invention is not limited to these embodiments, but various variations and modifications may be made without departing from the scope of the present invention.

What is claimed is:

1. A production control system for controlling a plurality of discrete producing points so that products are produced while parts are supplied to the producing points, said production control system comprising:
    a first producing point which is used as a center producing point and includes a data base;
    second producing points each having a data base;
    at least each of said second producing points producing a complete product to be delivered to a customer;
    said at least each of said second producing points being located in one of a counter and a region different from one of a country and a region, in which said first producing point is located; and
    at least one of a plurality of communication networks coupling the data bases of said first producing point and said second producing points,
    said first producing point comprising:
    first means for managing at least process sequence information which describes production processes and production times of each product for the first and each of the second producing points, capability information which describes the capability of each process for the first and each of the second producing points, surplus item information which describes surplus parts and products for the first and each of the second producing points, and calendar information including information on holidays of said one of the country and the region in which said at least each second producing point producing a complete product is located;
    second means for determining an optimum producing point for producing each product out of the first and second producing points based on new order information for each product obtained from customers and received at the first and each of the second producing points; and
    third means for instructing production of each product to the optimum producing point based on the new order information.

2. The production control system as claimed in claim 1, wherein said first means is operated to manage a stock planning information which describes the number of parts available by time for each part in correspondence with the first and each of the second producing points, a stock master information which is related to supply of each part for the first and each of the second producing points, and calendar information which describes working days of the first and each of the second producing points.

3. The production control system as claimed in claim 2, wherein the stock planning information includes a first stock planning information which describes the number of parts available by week for each part in correspondence with the optimum producing point, and a second stock planning information which describes the number of parts available by week for each part in correspondence with the second producing point which is instructed to supply the parts, and the stock master information describes the second producing point which is to supply each part together with the number of parts and the time period in which the parts are to be supplied.

4. The production control system as claimed in claim 3, wherein said first producing point further comprises:
    fourth means for determining out of the second producing points an optimum supplying point which is to supply the parts required for the production in the optimum producing point depending on the new order information by investigating the first and second stock planning information; and fifth means for instructing the optimum supplying point to transfer to the optimum producing point the parts which are required for the production in the optimum producing point.

5. The production control system as claimed in claim 4, wherein said second producing points comprise means for notifying to said first producing point via said communication network the new order information, the process sequence information, the capability information, the surplus item information, the stock planning information, the stock master information, and the calendar information.

6. The production control system as claimed in claim 1, wherein said first producing point includes a computer aided design system, a production management system, and an internal local area network which couples the computer aided design system and the production management system.

7. The production control system as claimed in claim 1, wherein each of said second producing point includes a computer aided design system, a production management system, and an internal local area network which couples the computer aided design system and the production management system.

8. The production control system as claimed in claim 1, which further comprises a mail box which is classified by a customer who places orders by the new order information, said mail box being coupled to the communication network which couples said first and second producing points.

* * * * *